United States Patent [19]
Culver

[11] 3,844,044
[45] Oct. 29, 1974

[54] MOUNTING FOR PRECISION FRICTION WHEEL MEASURING DEVICES
[75] Inventor: Irven H. Culver, Playa Del Rey, Calif.
[73] Assignee: Primus Mfg., Inc., San Lorenzo, P.R.
[22] Filed: May 7, 1973
[21] Appl. No.: 357,604

[52] U.S. Cl.............................. 33/125 M, 33/141 E
[51] Int. Cl. ............................................ G01b 3/12
[58] Field of Search .......................... 33/141, 125 M

[56] References Cited
UNITED STATES PATENTS
3,311,985   4/1967   Hodge............................. 33/141 A
3,724,082   4/1973   Culver............................. 33/125 M Primary Examiner—Harry N. Haroian
Attorney, Agent, or Firm—Christie, Parker & Hale

[57] ABSTRACT

There is described a mounting for a frictionally driven distance measuring metering wheel which provides adjustment for the tracking engagement as well as the angle of contact between the metering wheel and the measurement surface along which the wheel rolls in use. A frame plate is part of the housing structure for the metering wheel and a mounting plate is movable along the measurement surface. The frame plate has a planar surface which contacts a pair of curved support surfaces projecting above the mounting plate. The curved support surfaces contact the frame plate along a line perpendicular to the axis of rotation of the metering wheel and closely adjacent the plane of the metering wheel. The frame plate is tiltable about these support surfaces and also slidable transversely on the surfaces to provide positioning adjustment for the metering wheel.

11 Claims, 4 Drawing Figures

PATENTED OCT 29 1974 3,844,044
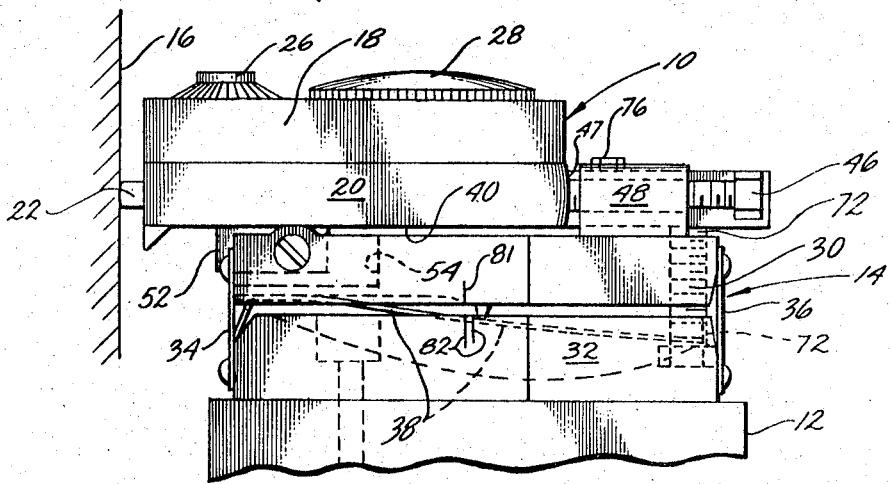
Fig. 1
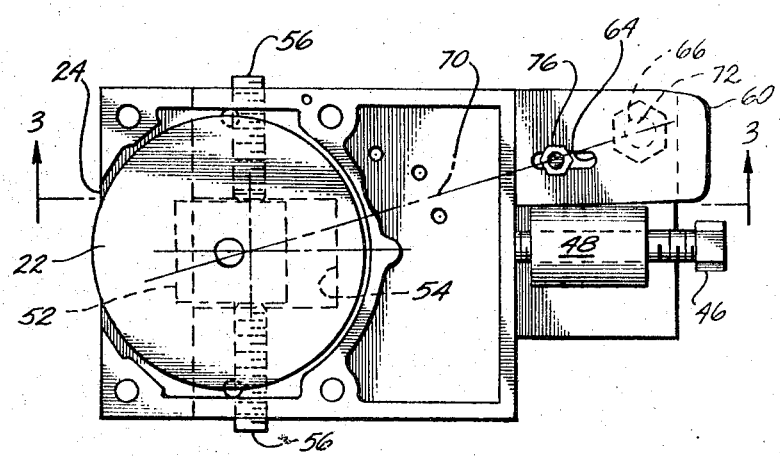
Fig. 2
Fig. 3
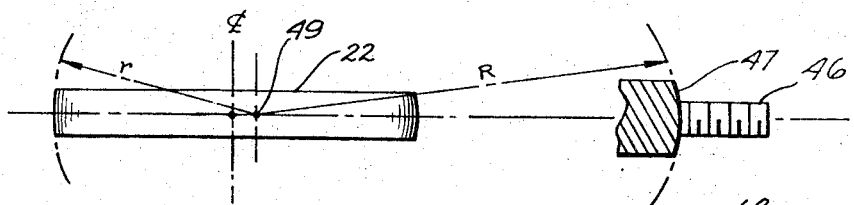
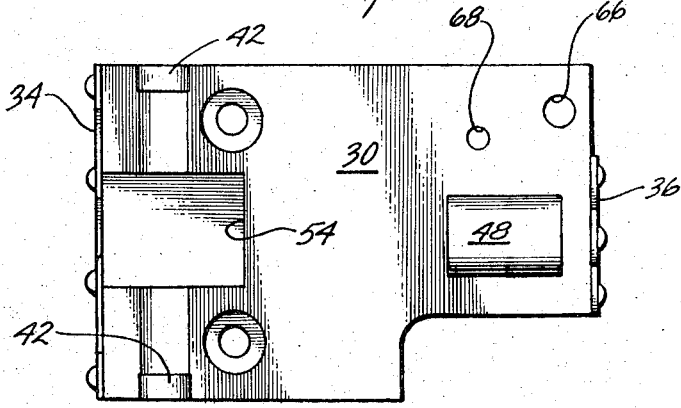
Fig. 4

MOUNTING FOR PRECISION FRICTION WHEEL MEASURING DEVICES

FIELD OF THE INVENTION

This invention relates to precision distance measuring devices using a friction wheel drive, and more specifically, relates to apparatus for adjustably mounting the measuring device.

Precision distance measuring devices, such as described in U.S. Pat. No. 3,378,929, utilize a friction wheel rolling along a surface to measure the distance traversed. Such devices are commonly used in combination with machine tools to indicate the distance a moving carriage on the tool moves relative to the frame or other point of reference. For example, such a measuring device may be mounted to the carriage of a lathe with the friction wheel engaging the guide surface of the lathe bed to indicate the distance the carriage moves along the lathe. The friction wheel is carefully ground to an accurately determined circumference which permits revolution of the wheel to be translated into a distance measurement indication.

It has been found that the accuracy and repeatability of measurements made by such devices is influenced by a number of factors. Such factors as the amount of skew, pitch, and pressure between the surface of the wheel and the measurement surface are of critical importance. The effect of skew, that is, any deviation of the plane of rotation of the measuring wheel from parallel to the line of gross relative movement of the measuring device along the measurement surface, affects the ability of the device to traverse the length of the measurement surface repeatedly and still come back to zero reading at the starting point, referred to as a "repeatability error". The effect of the angle of skew on repeatability errors is discussed in detail in U.S. Pat. No. 3,561,120. Variation in pitch is used to control the effective circumference of the wheel by forming the peripheral surface of the wheel as a portion of a sphere, rather than a cylinder. This effect is described in detail in U.S. Pat. No. 3,307,265.

Variations in the force of engagement of the metering wheel with the measurement surface also have an adverse affect, as discussed in copending application Ser. No. 159,201, filed July 2, 1971, now issued as U.S. Pat. No. 3,740,856 and assigned to the same assignee as the present invention. This application describes a mounting for the measurement instrument which utilizes a resilient loading that exhibits an effective spring rate of zero magnitude, that is, the force developed by the resilient device is substantially constant as a function of deflection. However, the deflection loading system when combined with the adjustable mounting below the biasing or loading mechanism, has presented problems in that axes about which the positioning adjustments are made are displaced substantial distances from the plane of the measuring wheel itself. Because of this rather large moment arm, the adjustment of pitch angle results in large displacement of the mounting in a direction perpendicular to the measuring surface. This displacement makes it difficult to adjust to the desired pitch and still remain within the limits of constant force of the spring loading system.

SUMMARY OF THE PRESENT INVENTION

The present invention is directed to an improved mounting arrangement for a friction-wheel type linear measurement device incorporating the low spring constant loading system described in the above-identified pending application. In brief, the present invention provides an adjustable mounting arrangement for the measuring device in which the apparent axis about which the pitch angle of the measurement wheel is adjusted extends through or very close to the center of the crown radius of the measuring wheel. Transverse adjustments are made between the measurement device and the spring loading assembly. The axis along which the transverse force for movably adjusting the measuring device towards or away from the measurement surface lies along a diameter through substantially the center of the measurement wheel.

This is accomplished by providing a frame member which is integral with the measurement device and which rotatably supports the measuring wheel, the frame member having a planar surface substantially perpendicular to the axis of rotation of the drive wheel. A spring loaded support member has a pair of spaced projecting fixed support points which engage the planar surface, the frame member being tiltable relative to the support member on the support points. An adjusting screw threadably mounted on the support member engages the frame member along an axis passing through the center of the measuring wheel in a direction parallel to said planar surface, the adjusting screw moving the frame member relative to the support member by sliding the planar surface across the support points. A third support point on the support member engages the planar surface and is adjustable vertically to tilt the frame member about the fixed supports. Means is also provided for clamping the frame member in any transverse and lateral position after adjustment.

BRIEF DESCRIPTION OF THE DRAWINGS

For a more complete understanding of the invention, reference should be made to the accompanying drawings, wherein:

FIG. 1 is a side view of a friction-wheel measuring device mounted on a machine tool using the mounting arrangement of the present invention;

FIG. 2 is a top view with the upper portion of the measuring device removed;

FIG. 3 is a schematic view from the side showing the location of the tilt axis about which the pitch adjustment takes place; and FIG. 4 is a top view of the support member with the measuring unit removed.

DETAILED DESCRIPTION

Referring to the drawings in detail, the numeral 10 indicates generally a friction-wheel distance measuring device of the type described in detail in U.S. Pat. No. 3,378,929. The measuring device 10 is mounted on a movable portion of a machine tool, such as the carriage of a lathe or the like, by a mounting block 12, partially shown in FIG. 1. The block 12 is preferably adjustably attached to the machine tool by the four-screw mounting shown and described in U.S. Pat. No. 3,307,265. Mounting of the measuring device is accomplished by an adjustable mounting assembly 14 hereinafter described in detail. Movement of the carriage causes the measurement device 10 to travel parallel to a measurement surface 16 which may be a guideway or other machined surface relative to which the carriage is moved, such as the bed of a lathe.

The measuring device 10 includes a housing formed of an upper frame member 18 and lower frame member 20. A metering wheel 22 is journaled within the housing, a segment of the periphery of the wheel projecting through an opening 24 in the housing so as to be engageable with the surface 16. An internal gearing arrangement (not shown) amplifies the rotation of the metering wheel 22, producing proportional rotation of a gross indicator dial 26 and a fine measurement indicator dial 28.

Mounting of the measuring device 10 is provided by a support member 30 which is spring loaded in a manner described in detail in copending application Ser. No. 67,379, filed Aug. 27, 1970, now issued as U.S. Pat. No. 3,724,082 and assigned to the same assignee as the present application. Thus there is provided a lower support member 32 which is bolted or otherwise secured to the block 12. The upper and lower support members 30 and 32 are held in spaced relatively movable relationship by flat springs 34 and 36 extending between the ends of the upper and lower support members. These flat springs permit transverse movement of the upper support member relative to the lower support member. An elongate sheet 38 of spring metal has its opposite ends in abutting contact with the upper and lower support members such that any force applied to the upper support member 30 in a direction away from the measurement surface 16 causes the sheet 38 to buckle downwardly in the center under compression. When in a buckling mode, the force required to buckle the sheet 38 is substantially constant as a function of relative lateral displacement between the two support members, all as described in detail in the above-identified copending application.

To provide transverse loading of the metering wheel 22 against the measurement surface 16 and at the same time change the angle between the plane of rotation of the metering wheel 22 and the measurement surface 16, adjustable means is provided for securing the lower frame plate 20 of the metering device to the upper support member 30. To this end, the bottom of the plate 20 is formed with a substantially planar surface as indicated at 40. This planar surface rests on a pair of fixed supports 42 projecting upwardly from the top of the support member 30. The fixed supports are preferably formed by an arcuate surface to permit the planar surface 40 to slide more easily across the top of the supports. The axis of the pair of fixed supports 42 is aligned substantially parallel to the direction of movement of the carriage.

Transverse positioning of the frame member 20 is provided by an adjusting screw 46 which threadably engages and extends through an integral bracket 48 formed on top of the upper support member 30. The adjusting screw 46 engages a back surface 47 of the frame member 20 along an axis passing through the center of the metering wheel 22 and in a direction substantially parallel to the planar surface 40. The surface 47, as shown in FIG. 3, is cylindrically formed with a radius R about a point 49 lying along said axis. Tightening of the adjustment screw 46 applies a normal force between the metering wheel 22 and the measurement surface 16. This force is applied so that substantially no couple is formed tending to rotate the frame member 20 about any axis. Thus the adjustment of the screw 46 can be made with the frame member 20 resting freely on top of the supports 42.

To adjust the pitch of the housing 10, the housing 10 has a tang 60 integral with and extending back from the frame member 20 on one side of the bracket 48. The tang 60 has an elongated slot 64. Immediately below the tang in the upper support member 30 is a pair of threaded holes 66 and 68 (see FIG. 4) which are centered along an axis 70 that crosses the axis of the supports 42 midway between the fixed supports. The hole 66 is engaged with a screw member 72. When screw 76 lies in the middle of the length of slot 64, point 49 lies substantially over the axis of supports 42. The upper end of the screw member 72 engages the bottom of the tang 60 to provide a third point of support for the measuring device 10. Rotation of the screw member 72 causes the end of the tang 60 to be raised or lowered. A screw 76 extending through the slot 64 and threadably engaging the hole 68 clamps the frame member 20 against the top of the screw 72 and against the top of the fixed supports 42. By rocking the frame member 20 of the measuring device 10 on the supports 42, the plane of the metering wheel 22 relative to the measurement surface 16 may be tilted to adjust the pitch. As shown in FIG. 3, the metering wheel has its outer perimeter crowned slightly at a radius r greater than the radius of the wheel. Thus by tilting the housing 10 on the fixed supports 42, the effective perimter of the metering wheel where it contacts the surface 16 can be varied. The housing of the metering device 10 is locked in place against lateral or transverse movement by means of a lug 52 integral with and extending below the planar surface 40 into a recess 54 in the support member 30 between the fixed supports 42. A pair of threaded holes extend through the support member 30 for receiving clamping screws 56 which engage either side of the lug 52 to clamp the housing 10 in position.

To adjust the mounting, the clamping screws 56 and the screw 76 are loosened. The adjusting screw 46 is then tightened until the sheet 38 is placed in the buckling mode by causing the sheet 38 to buckle slightly. This condition is indicated by indexing marks 81 and 82 on the side of the frame member 20 and support member 30. When the mark 81 is positioned between the marks 82, the device is properly loaded. The screw member 72 and lock screw 76 are then adjusted to set the pitch of the housing 10 on the supports 42 to obtain the desired accuracy and repeatability of the linear measuring system.

As seen in FIG. 3, the tilting of the frame member 20 does not change the distance between the surface 16 and screw 46 because the crowned edge of the wheel and the curved back surface 47 of the frame member 20 are radiused about a common point. This permits the transverse position to be set first, and then the pitch to be set without disturbing the transverse position. After both adjustments are made the frame member is clamped in place by the screws 56.

What is claimed is:

1. A mounting for attaching a distance measuring device having a metering wheel to a base element, the metering wheel being adapted to roll along a measuring surface with movement of the base element, the mounting comprising: a first member rotatably supporting the metering wheel, the member having a planar surface perpendicular to the axis of rotation of the metering wheel, a second member having a pair of projecting support surfaces contacting the planar surface of the first member at two separated points along a line extending parallel to the measuring surface, means securing the first member to the second member with the projecting surfaces in contact with said planar surface, means including a resilient loading member movably attaching the second member to the base element, and adjustable means for moving the first member and associated wheel laterally relative to the second member in a direction toward said measuring surface perpendicular to said line of engagement of the two support surfaces.

2. Apparatus of claim 1 further including means for tilting the first member relative to the second member about said line of contact of the two support surfaces with said planar surface.

3. Apparatus of claim 2 wherein the means securing the first member to the second member includes means releasably clamping the first member in any adjustable lateral and transverse position relative to the second member.

4. Apparatus of claim 3 wherein said clamping means includes a lug projecting from said planar surface of the first member into a slot in the second member, and screw means on the second member engaging the lug to clamp the lug securely in the slot.

5. Apparatus of claim 1 wherein the resilient loading member is effective to bias the second member in a direction to urge the metering wheel into contact with the measuring surface.

6. Apparatus of claim 5 in which the resilient means urges with a force that is substantially constant within a range of lateral movement of the second member relative to the base.

7. An adjustable mounting for a linear measurement device utilizing a metering wheel, comprising: a frame member integral with the measurement device, the frame member having a flat surface substantially perpendicular to the axis of rotation of the wheel, a support member having a pair of spaced projecting surfaces engaging said planar surface, the frame member being tiltable relative to the support member for tilting the axis of the metering wheel, means secured to the support member and engaging the frame member for displacing the frame member relative to the support member along a line passing through the center of the metering wheel in a direction substantially perpendicular to the axis of rotation of the wheel and to the axis of tilt of the frame member about said projecting surfaces, said displacing means being adjustable to slide said planar surface on the projecting surfaces, and means for clamping the frame member securely in any adjusted position relative to the support member.

8. Apparatus of claim 7 wherein the clamping means includes a lug projecting below said surface of the frame member, the support member having a slot between the spaced pivots for receiving the lug, and screw means threadably mounted in the support member on either side of the slot, the screw means engaging the lug in clamping relationship.

9. Apparatus of claim 7 wherein the frame member includes a back surface extending substantially perpendicular to the planar surface, the back surface being radiused about a point in a plane defined by the axis of rotation of the wheel and perpendicular to said axis of tilt about the projecting surfaces, the frame member displacing means contacting the radiused back surface of the frame member.

10. Apparatus of claim 9 wherein the outer edge of the metering wheel is crowned, the center of the crowned radius in said plane substantially the same point as the center of radius of said radiused back surface of the frame member.

11. A mounting for attaching a distance measuring device having a metering wheel to a base element, the metering wheel being adapted to roll along a measuring surface with movement of the base element, the mounting comprising; a first member rotatably supporting the metering wheel, a second member, means including a resilient loading member movably attaching the second member to the base element, one of said first and second members having a planar surface perpendicular to the axis of rotation of the metering wheel, the other of said first and second members having a pair of projecting support surfaces contacting the planar surface of the other member at two separated points along a line extending parallel to the measuring surface, means securing the first member to the second member with the projecting surfaces in contact with said planer surface, and adjustable means for moving the first member and associated wheel laterally relative to the second member in a direction toward said measuring surface perpendicular to said line of engagement of the two support surfaces.

* * * * *